(12) United States Patent
Peschke et al.

(10) Patent No.: US 7,891,878 B2
(45) Date of Patent: Feb. 22, 2011

(54) JOINT BEARING

(75) Inventors: Harald Peschke, Veitsbronn (DE); Olaf Wilhelm, Halle (DE); Thomas Fickert, Feuchtwangen (DE)

(73) Assignee: Schaeffler KG, Herzogenaurach (DE)

( * ) Notice: Subject to any disclaimer, the term of this patent is extended or adjusted under 35 U.S.C. 154(b) by 235 days.

(21) Appl. No.: 11/994,181

(22) PCT Filed: Jun. 22, 2006

(86) PCT No.: PCT/EP2006/005999

§ 371 (c)(1),
(2), (4) Date: Jan. 16, 2008

(87) PCT Pub. No.: WO2007/000275

PCT Pub. Date: Jan. 4, 2007

(65) Prior Publication Data

US 2008/0199113 A1 Aug. 21, 2008

(30) Foreign Application Priority Data

Jun. 28, 2005 (DE) ........................ 10 2005 029 979

(51) Int. Cl.
*F16C 33/74* (2006.01)
*F16C 23/04* (2006.01)

(52) U.S. Cl. ....................................... 384/147; 384/192

(58) Field of Classification Search ................. 384/147, 384/148, 149, 159, 151, 152, 153, 192, 206, 384/145, 146

See application file for complete search history.

(56) References Cited

U.S. PATENT DOCUMENTS

| | | | | |
|---|---|---|---|---|
| 3,848,938 A | * | 11/1974 | Stella et al. | 384/146 |
| 4,080,015 A | * | 3/1978 | Greby et al. | 384/206 |
| 4,109,976 A | * | 8/1978 | Koch | 384/192 |
| 5,040,804 A | * | 8/1991 | Back | 277/558 |
| 5,573,336 A | * | 11/1996 | Maroney | 384/146 |

FOREIGN PATENT DOCUMENTS

| | | |
|---|---|---|
| DE | 24 08 740 A | 9/1974 |
| DE | 87 03 962 | 4/1987 |
| DE | 299 00 907 A | 4/1999 |
| GB | 10 42 265 | 9/1966 |
| JP | 2002 1 81 201 | 6/2002 |

* cited by examiner

Primary Examiner—Thomas R Hannon
Assistant Examiner—Phillip A. Johnson
(74) Attorney, Agent, or Firm—Lucas & Mercanti, LLP

(57) ABSTRACT

The invention relates to a spherical plain bearing, having an inner ring with a spherically curved outer surface and an outer ring having a spherically curved inner surface, a seal being arranged in a continuous groove in the outer ring. The seal has an annular support and rubs against the outer surface of the inner ring. The seal has two mutually spaced resilient sealing lips facing in opposite directions. The first sealing lip being oriented outwards and the second sealing lip being oriented inwards.

6 Claims, 3 Drawing Sheets

JOINT BEARING

FIELD OF THE INVENTION

The invention relates to a spherical plain bearing, consisting of an inner ring having a spherically curved outer surface and an outer ring receiving the inner ring and having a spherically curved inner surface, a seal being arranged in a continuous groove in the outer ring, which seal comprises an annular support with a substantially angular cross-section and a sealing body connected to the support, which sealing body rests rubbingly against the spherically curved outer surface of the inner ring.

BACKGROUND OF THE INVENTION

Such a spherical plain bearing with associated sealing unit is previously known from DE 299 00 907 U1. As is clear from FIGS. 1, 2 and 3 and the associated description, a sealing unit is arranged in a groove in the outer ring of a spherical plain bearing, which sealing unit rests rubbingly against the spherically curved outer surface of the inner ring. Said sealing unit consists of an angular support, which is connected to the resilient sealing body, which rests in turn rubbingly against the outer surface of the inner ring. The sealing body is received at its outer end by means of a projection by the continuous groove in the outer ring and comprises a single sealing lip pointing in the direction of the inner ring, said sealing lip resting with two rubbing sealing edges against the inner ring. The third rubbing sealing edge is connected directly to the sealing body and is therefore relatively rigid. All three successive sealing edges rest simultaneously against the spherically curved outer surface of the inner ring, the prestress being approximately identical. These sealing edges are therefore worn uniformly, which is not advantageous from a sealing standpoint.

SUMMARY OF THE INVENTION

The object of the invention is therefore to provide a sealing unit for a spherical plain bearing which provides a reliable seal and which is unaffected by wear.

According to the invention, this object is achieved according to the characterizing clause of Claim 1 in conjunction with the precharacterizing clause thereof in that, in the direction of the inner ring, the sealing body comprises two mutually spaced resilient sealing lips facing in opposite directions, the first sealing lip being oriented outwards and the second sealing lip being oriented inwards relative to a plane extending perpendicularly to a bearing axis and both sealing lips comprising at least one rubbing sealing edge, a second sealing edge adjoining the first rubbing sealing edge in an inwardly spaced manner, which second sealing edge, when fitted, is spaced from the spherically curved outer surface of the inner ring by a gap when wear has not yet occurred.

The two mutually independent sealing lips ensure relatively low wear due to their resilient connection to the sealing body, wherein, over a long period from a sealing standpoint, a high surface pressure is obtained with punctiform application of the sealing lips. The outwardly directed sealing lip with its rubbing sealing edge here assumes the main sealing function, but is assisted in the sealing action by the inwardly directed second sealing lip with its sealing edge. The action of the second, inwardly spaced sealing edge of the first sealing lip is offset time-wise and only engages with its unused geometry when the first rubbing sealing edge has been affected by wear. A second rubbing sealing edge is therefore provided which assists the first rubbing sealing edge as its action deteriorates. As wear of the first rubbing sealing edge increases, the sealing action of the second rubbing sealing edge increases, such that the spherical plain bearing is reliably sealed under all operating conditions even as wear thereof progresses.

Further advantageous variant embodiments of the invention are described in subclaims 2 to 6.

Thus, according to the invention, the first rubbing sealing edge of the first sealing lip, when fitted, rests with prestress against the spherically curved outer surface of the inner ring. This prestress ensures firm application of the sealing lip, such that dirt is prevented from penetrating from the outside to the inside of the spherical plain bearing.

According to a further feature of the invention, the third rubbing sealing edge of the second sealing lip is intended, when fitted, to rest against the spherically curved outer surface of the inner ring with a degree of prestress which is substantially less than the prestress of the first rubbing sealing edge of the first sealing lip. This is intended to make explicit the fact that the third rubbing sealing edge of the second sealing lip is only ever intended to assist the first sealing lip, which plays the main part in the sealing action of the spherical plain bearing.

According to a further feature of the invention, it is intended that a first leg of the angular support should extend in the direction of the sealing body parallel to the bearing axis and that a second leg should extend parallel to the plane passing through the bearing midpoint, the second leg pointing in the direction of the first rubbing sealing edge.

This mutual association of angular support and sealing body ensures that the seal is on the one hand of very stable construction and may on the other hand also be anchored precisely in the continuous groove in the outer ring.

It is also possible for the first leg of the angular support to be surrounded on its outside at least in part by the sealing body. In this way, an intimate connection of angular support and sealing body is provided, such that the rigidity of the entire seal is increased further.

As is clear from the figures it is intended for the angular support to consist of a metal and for the sealing body to consist of an elastomer.

Finally, the spherical plain bearing takes the form of a maintenance-free dry plain bearing, an overlay being arranged between the spherically curved inner surface of the outer ring and the spherically curved outer surface of the inner ring Since this bearing type is designed not to need relubricating over its life, a seal is needed which is particularly far-reaching in its action and operates reliably.

The invention is explained in greater detail with reference to the following exemplary embodiment.

DETAILED DESCRIPTION OF THE DRAWINGS

Figure 1:
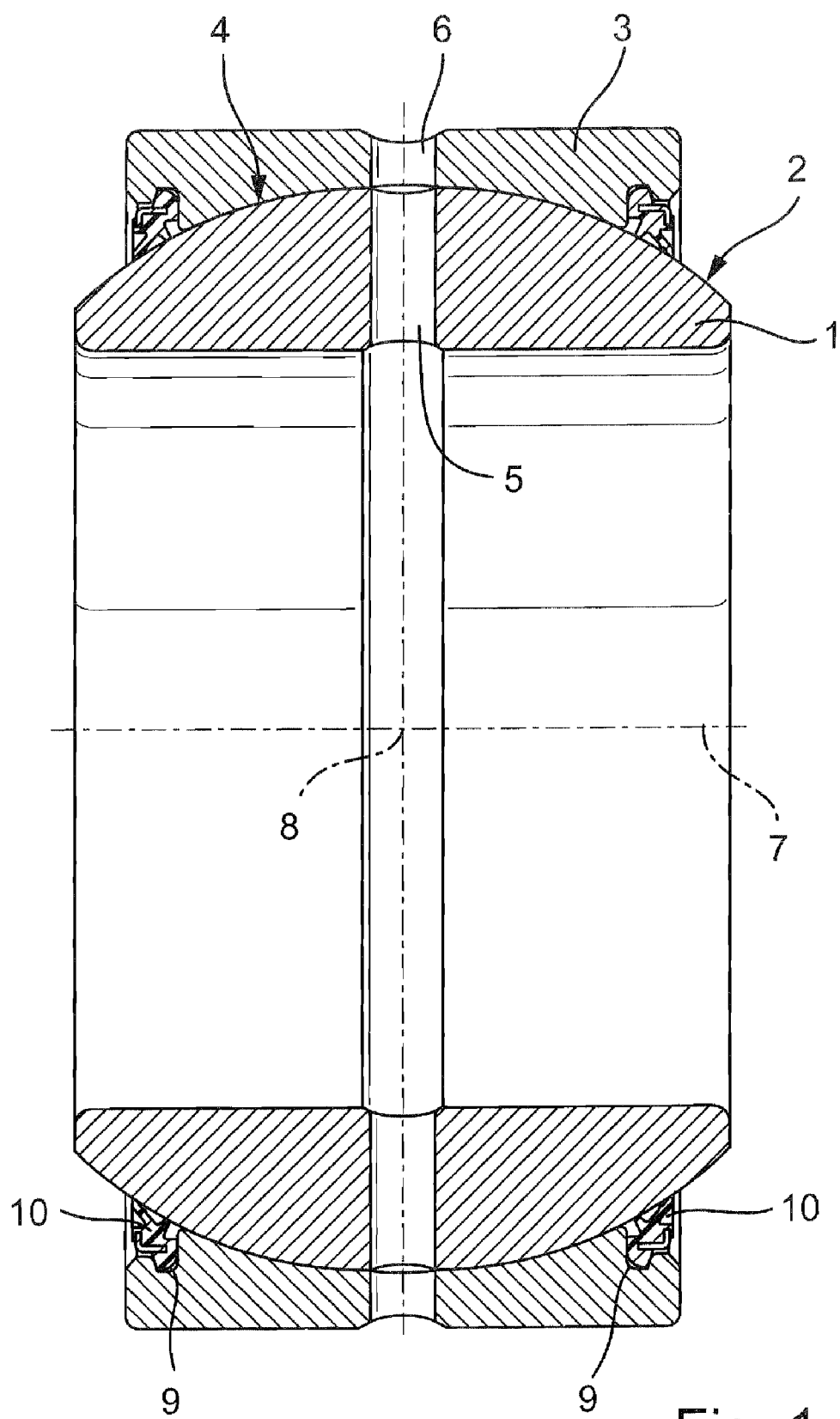
FIG. 1 shows a longitudinal section through a spherical plain bearing according to the previous prior art.

The prior art spherical plain bearing illustrated in the sectional representation of FIG. 1 comprises the inner ring 1, which is received via its spherically curved outer surface 2 by the opposingly spherically curved inner surface 4 of the outer ring 3. The spherical plain bearing further comprises the seal 10, which is fastened in the continuous groove 9 in the outer ring 3. At the other end the seal 10 rests with its sealing lips rubbingly against the spherically curved outer surface 2 of the inner ring 1, such that the two curved surfaces 2 and 4 of the bearing rings 1 and 3 are safeguarded against dirt penetrating from the outside. The figure further shows that in the present example the spherical plain bearing may be relubricated, in this case both the inner ring 1 and the outer ring 3 being provided with lubricant passages 5 and 6. As is also visible, when the outer ring 3 is arranged fixedly in the housing, the inner ring 2 may be moved rotationally about its bearing axis 7, swivelling about the bearing midpoint 8 also being possible.

Figure 2:
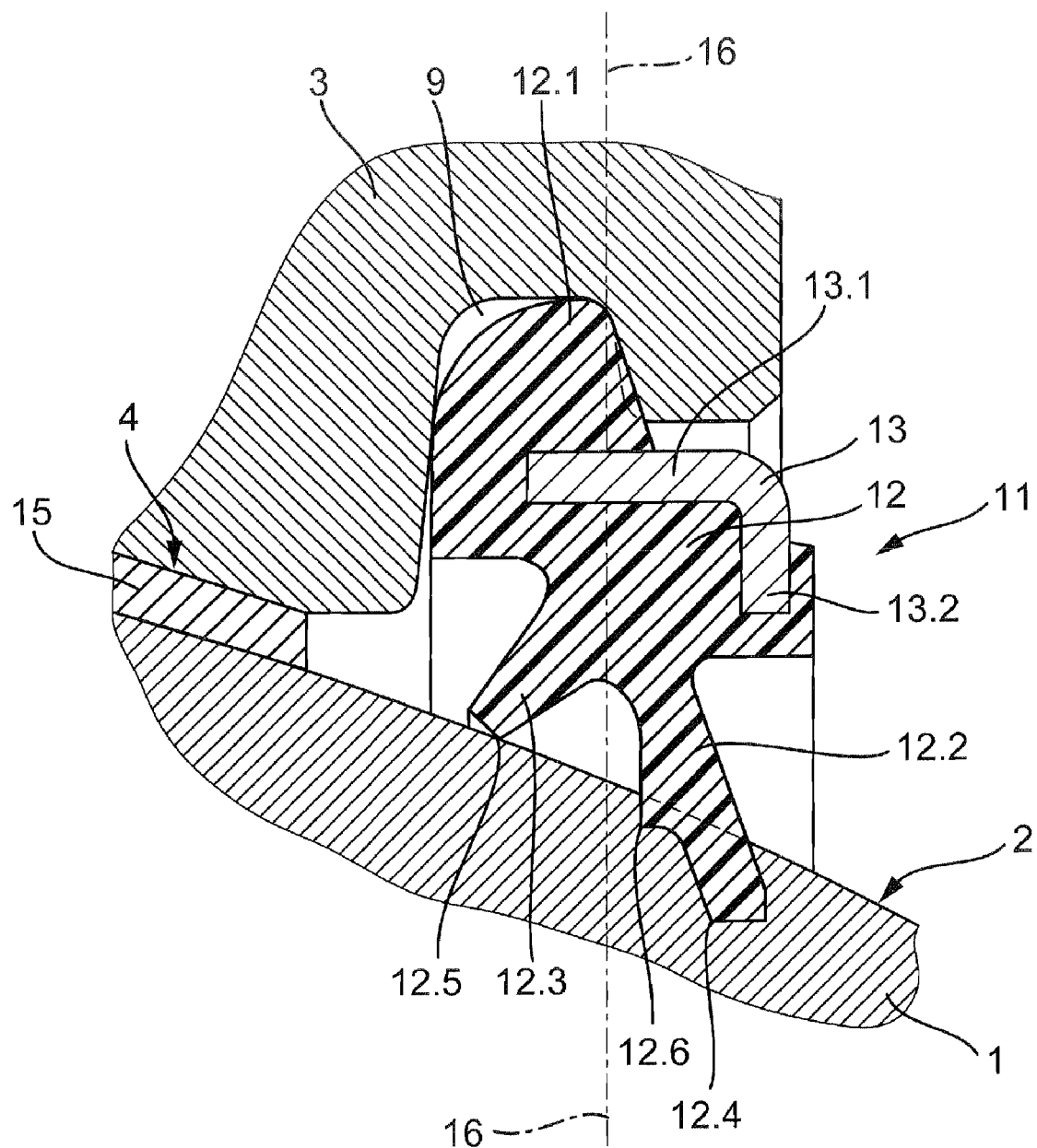
FIG. 2 shows an enlarged representation of a portion of a spherical plain bearing sealed according to the invention prior to fitting and FIG. 3 shows the same after fitting.
Figure 3:
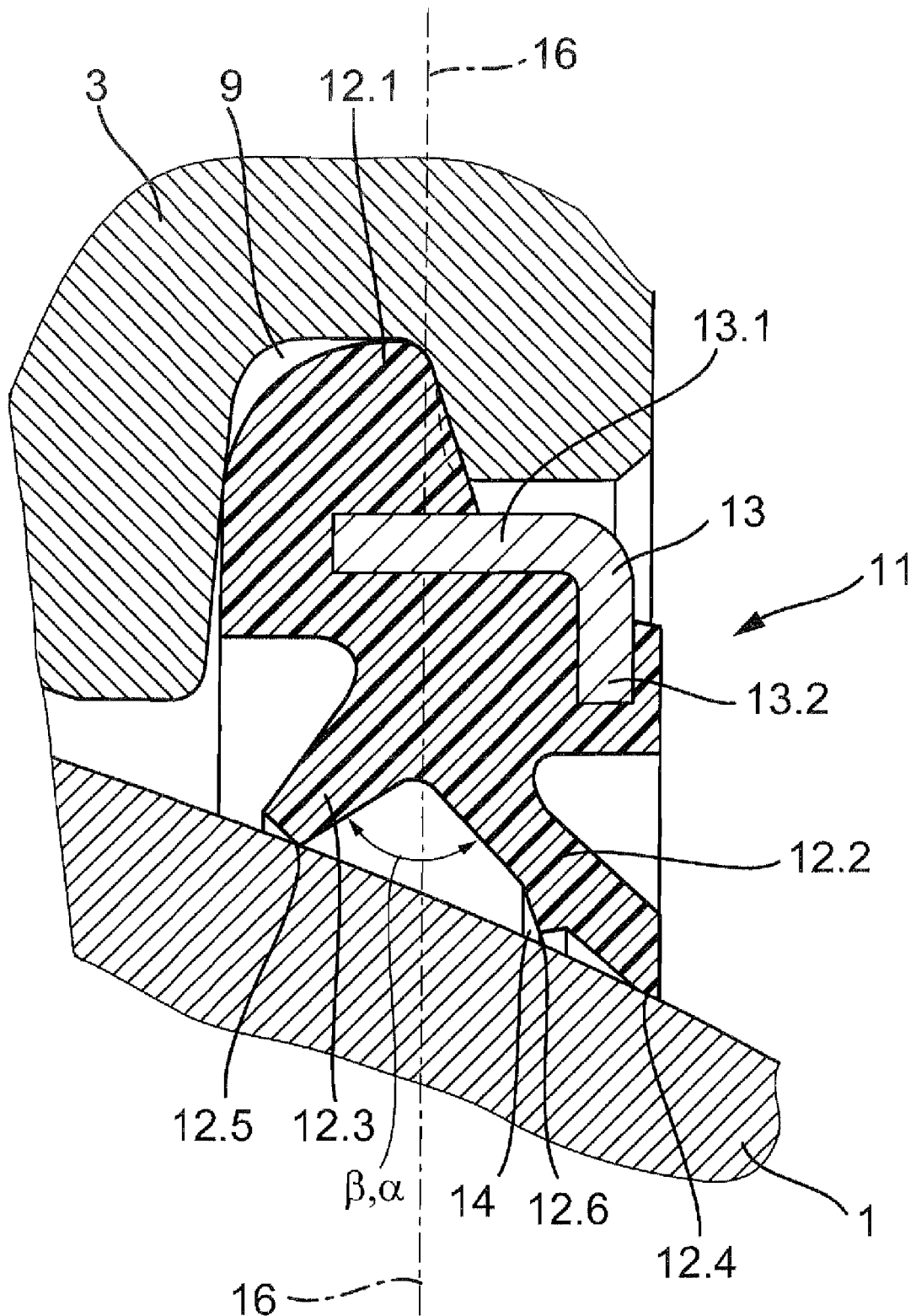

As is clear from FIGS. 2 and 3, the seal 11 according to the invention consists of the sealing body 12 and the support 13, the support 13 being vulcanized into the sealing body 12. The sealing body 12 consisting of an elastomer comprises the projection 12.1 at the outer end, with which projection 12 it is inserted in the continuous groove 9 in the outer ring 3. The support 13 consisting of an iron material comprises the first leg 13.1 extending inwards in an axial direction and the second leg 13.2 arranged at a right angle thereto and extending parallel to the plane 16. Both legs 13.1, 13.2 are surrounded on their outsides at least in part by the sealing body 12, so forming a stable seal 11.

In the direction of the inner ring 1, the sealing body 12 splits into the two mutually spaced sealing lips 12.2 and 12.3, the first sealing lip being denoted 12.2 and the second sealing lip 12.3. Both sealing lips 12.2, 12.3 are connected resiliently to the sealing body 12, the first sealing lip 12.2 extending outwards at an angle relative to the plane 16 and the second sealing lip 12.3 extending inwards at an angle. The plane 16 passes through the seal 11 and extends perpendicularly to the bearing axis 7. The angle of inclination of the first sealing lip 12.2 is denoted α and the angle of inclination of the second sealing lip 12.3 is denoted β. A comparison of the two figures (FIG. 2 showing the seal 11 unfitted and FIG. 3 showing the seal 11 fitted) shows that the prestress of the first sealing lip 12.2 and thus of the first sealing edge 12.4 is substantially greater than the prestress of the second sealing lip 12.3 and thus of the sealing edge 12.5. This results from the fact that the angle of inclination β remains virtually the same, while the angle of inclination α increases, since the first sealing lip 12.2 is deflected outwards when fitted.

FIG. 3, in which the seal 11 has just been fitted and not yet affected by wear, reveals that the gap 14 is formed between the second sealing edge 12.6 and the spherically curved outer surface 2 of the inner ring 1. As the first sealing edge 12.4 suffers increasingly from wear, the gap 14 gradually diminishes, until it has finally disappeared completely and the second sealing edge 12.6 likewise rests rubbingly against the spherically curved outer surface 2 of the inner ring 1. Thus, according to the invention a triple seal is produced, which is ultimately unaffected by wear and is formed by the sealing edges 12.4, 12.6 and 12.5. These three rubbing sealing edges start from the outside with the first sealing edge 12.4, followed by the second sealing edge 12.6 and finally the third sealing edge 12.5 and ensure in an impressive manner that no dirt and no moisture is able to penetrate into the bearing from outside. This is of particular significance, since in the exemplary embodiment the spherical plain bearing according to the invention is provided with a high-quality overlay 15 which needs to be reliably protected. Thus, for example, material based on PTFE (polytetrafluoroethylene) is feasible for the overlay 15, PTFE composite, PTFE film and PTFE fabric being listed in ascending order of performance.

REFERENCE SIGNS

1 Inner ring
2 Spherical outer surface
3 Outer ring
4 Spherical inner surface
5 Lubricant passage
6 Lubricant passage
7 Bearing axis
8 Bearing midpoint
9 Continuous groove
10 Seal
11 Seal
12 Sealing body
Projection
First sealing lip
Second sealing lip
First sealing edge
Third sealing edge
Second sealing edge
13 Support
Leg
Leg
14 Gap
15 Overlay
16 Plane
α Angle of inclination
β Angle of inclination

The invention claimed is:

1. A spherical plain bearing, comprising:
an inner ring having a spherically curved outer surface;
an outer ring receiving the inner ring and having a spherically curved inner surface and a continuous groove, the continuous groove having an outwards sloping wall connected to a flat base by a first rounded corner and a linearly inwards sloping wall, opposite the outwards sloping region, connected to the flat region by a second rounded corner; and
a seal having a projection arranged in the continuous groove in the outer ring, the projection having a predominately rounded contour with a linearly outwards sloping region making complete contact with the linearly outwards sloping wall and the first rounded corner of the continuous groove and making only partial contact with the flat base and inwardly sloping wall of the continuous groove, and the seal having an L-shaped annular support with a substantially angular cross-section and a sealing body connected to the support, which rests rubbingly against the spherically curved outer surface of the inner ring, the annular support having a first leg and a second leg with both the first leg and the second leg having an inner face and an outer face, the first leg, which is longer than the second leg, extending inwards, in a direction of the sealing body, parallel to a bearing axis and the second leg extending radially inwards, parallel to a plane extending perpendicularly to the bearing axis, pointing in a direction of the inner ring, the sealing body completely surrounding the inner face of both the first leg and the second leg and partially surrounding the outer face of both the first leg and the second leg,
wherein, in the direction of the inner ring, the sealing body comprises two mutually spaced resilient sealing lips facing in opposite directions, a first sealing lip and a second sealing lip, the first sealing lip being oriented outwards and the second sealing lip being oriented inwards relative to the plane extending perpendicularly to the bearing axis, and both sealing lips having at least one first rubbing sealing edge, the first sealing lip having a second sealing edge adjoining the first rubbing sealing edge in an inwardly spaced manner, which when fitted, is spaced from the spherically curved outer surface of the inner ring by a gap when wear has not yet occurred.

2. The spherical plain bearing of claim 1, wherein when fitted, the first rubbing sealing edge of the first sealing lip rests with prestress against the spherically curved outer surface of the inner ring.

3. The spherical plain bearing of claim 1, wherein when fitted, the first rubbing sealing edge of the second sealing lip rests against the spherically curved outer surface of the inner ring with a degree of prestress which is substantially less than the prestress of the first rubbing sealing edge of the first sealing lip.

4. The spherical plain bearing of claim 1, wherein the annular support consists of a metal and the sealing body of an elastomer.

5. The spherical plain bearing of claim 1, wherein an overlay is arranged between the spherically curved inner surface of the outer ring and the spherically curved outer surface of the inner ring.

6. The spherical plain bearing of claim 1, wherein the first sealing lip is angled outwards relative to the plane and the second sealing lip is angled inwards relative to the plane.

* * * * *